June 16, 1942.　　　A. A. EWALD　　　2,286,904

HOSE REEL

Filed Dec. 30, 1939　　　2 Sheets-Sheet 1

INVENTOR
ARNO A. EWALD
BY
Wheeler, Wheeler & Wheeler
ATTORNEYS

June 16, 1942.  A. A. EWALD  2,286,904

HOSE REEL

Filed Dec. 30, 1939  2 Sheets-Sheet 2

INVENTOR
ARNO A. EWALD
BY
Wheeler, Wheeler & Wheeler
ATTORNEYS.

Patented June 16, 1942

2,286,904

UNITED STATES PATENT OFFICE 2,286,904

HOSE REEL

Arno A. Ewald, Oakfield, Wis., assignor to Romort Manufacturing Company, Oakfield, Wis., a corporation of Wisconsin Application December 30, 1939, Serial No. 311,745

5 Claims. (Cl. 299—78)

This invention relates to improvements in hose reels, with particular reference to reels for the support of flexible conduits in high pressure greasing systems.

It is a major object of the invention to provide a high pressure greasing system with a hose which is so counterbalanced on a reel that it will remain in any adjusted position, requiring positive action by the operator either to reel up the conduit or to unwind it. The conduit or hose applied in a device of this character must have an extremely heavy wall to withstand pressures that must in some instances run to ten thousand pounds to the square inch. To counterbalance a reel for rewinding such hose a fairly heavy spring is required. Yet the arrangement must be such that the action of the spring will be dependable since otherwise the hose may stick at some position or may be rewound undesirably at some other point. By the present invention I seek to provide a reel in which the swivel joint, the type of spring used, the arrangement and mounting of the reel and other factors, all cooperate to make the action uniform and dependable under all conditions of use, with no tendency for the hose either to wind or to unwind except at the conscious manipulation of the operator.

Because of the extremely high pressures involved and the consequent tendency of the hose to become rigid in any position, it is a further object of the invention to avoid breakage of the supply pipe by a specific arrangement and disposition thereof which distributes stresses that otherwise might be localized and result in crystallization and breakage.

In the drawings:

Fig. 4 is a view showing the interior mechanism in side elevation, the casing being broken away to a median section at right angles to that in which Fig. 1 is taken.

Like parts are identified by the same reference characters throughout the several views.

Figures 2, 3:
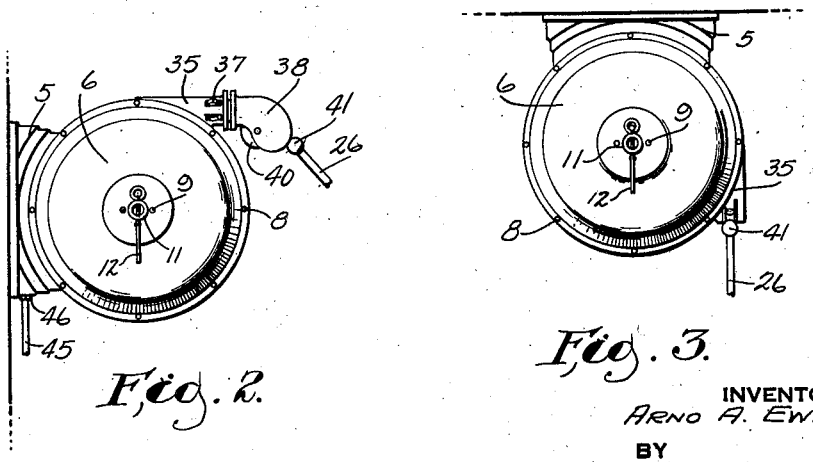
Fig. 2 is a view on a reduced scale showing in side elevation the reel mounted on a wall.
Fig. 3 is a view similar to Fig. 2 but showing the reel as it appears when mounted on a ceiling.
Figure 4:
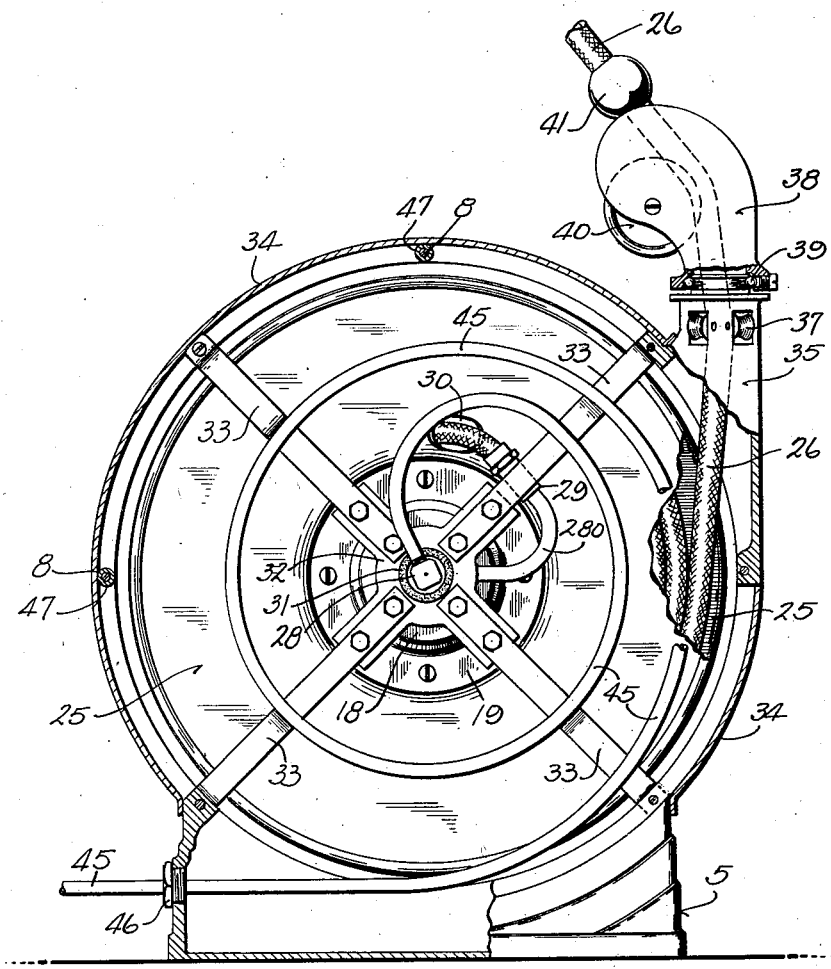

The mechanism is assembled upon a base 5 which may be mounted on a wall as shown in Fig. 2, or upon the ceiling as shown in Fig. 3, or upon the floor or the bottom of a service pit in the position shown in Fig. 4.

The housing for the reel mechanism comprises at least two separable parts 6 and 7 each of which is dished. The part 6 is rigidly mounted on the base 5 and carries the bearing support for one end of the reel. The housing front 7 is removable, being detachably connected at spaced intervals to part 6 by means of the bolts 8.

Adjustably held by means of screws 9 to the permanently mounted housing section 6, is a fitting 10 which provides a bearing support and spring anchorage for the reel. The sleeve-like extension 11 of this fitting extends through the housing and is provided with a key 12 by means of which the entire fitting may be rotated to a new position of adjustment to change the tension on the spring when the screws 9 have been removed. Interiorly the fitting is counterbored and shouldered to carry a bushing 15 which may be of the greaseless bearing type to provide a support for the trunnion 16 for the core 17 from which the reel is supported.

At its other end the core 17 extends into a sleeve-like member 18, closed at its outer end and anchored to the core. The member 18 is sufficiently spaced from the core to provide clearance for a torsion spring 20 one end of which is anchored to the closed end of the sleeve at 21. The other end of the spring 20 is anchored to the fitting 10 at 22.

The member 18 may comprise an integral part of the core. At its inner end it has an outwardly turned flange 19 which supports a hose supporting and winding reel 25, preferably comprising a pair of stampings, convergent at their inner margins and bolted to the flange 19, as clearly shown in Figure 1. Beyond the flange 19 these plates are substantially parallel and spaced from each other a distance but little greater than the diameter of the flexible hose 26 to be spirally coiled between them. The outer margins of the plates are outwardly turned to provide rounded surfaces which will not catch or cut the hose when it is being wound or unwound.

The end of the core which integrally provides the cup-shaped member 18 has a hollow trunnion 27 carrying at its end a part of the swivel fitting 28. Into a lateral opening from the hollow trunnion 27 is secured an elbowed or goosenecked pipe 280 to which is coupled at 29 the inner end of the flexible hose 26. This inner end projects from the reel through an aperture formed therein at 30 for the purpose. Between the pipe 280 and the outer end of trunnion 27 the trunnion is provided with a bearing support in bushing 31 which is mounted on a disk or plate 32 carried by arms 33 from the base 5 and permanent housing section 6 in the manner clearly shown in Figs. 1 and 4. The arms 33 and plate 32 together constitute a spider which provides for the bearing support of trunnion 27.

Preferably integral with the stationary section 6 of the housing is the outer band 34 of the housing from which casting 35 provides an outlet which is tangential with respect to the reel 25 to permit the ingress and egress of the hose 26 with respect to the reel housing. The casting 35 may be supplied with a variety of accessory fittings to guide the hose 26 in accordance with the particular requirements of the installation. By way of example, I have shown a plurality of spool pulleys 37 mounted within casting 35 to guide the hose, and I have also shown a swiveled delivery head 38 rotatable on anti-friction balls 39 with respect to the housing and supporting the pulley 40 over which the hose 26 passes to the valved nozzle (not illustrated) with which said hoses are conventionally supplied. The hose may carry a stop at 41 engageable with the swiveled fitting 38 to limit the extent to which the hose may be rewound upon the reel. By providing the housing with walls which converge toward the band 34 and the swivel head 38 it is possible to wind the hose from any direction of extension without dragging it across a corner of the housing. By having the entire housing in the form of an oblate spheroid I attain compactness and make it possible for men to work in the vicinity of the housing without striking projecting corners.

Leading to the swivel device 28 is the hose supply pipe 45 which enters through the base at 46 and is clamped to the base at 46 by the jamb nut illustrated in Fig. 4. However, this pipe is made of metal to stand high pressures and consequently is not flexible in any ordinary sense. I have found it important to the present invention that the pipe should include an extended helix as shown in Fig. 4 between its point of entry at 46 into the base of the device and the point at which it connects to the swivel fitting 28. Under high grease pressure the hose 26 wound upon the reel becomes so rigid and relatively inflexible that when it is wound or unwound it tends to subject the supply pipe 45 to bending stresses, such stresses being transmitted from the reel core to the pipe through the swivel fitting 28 which likewise becomes tight under the high pressures involved. If the pipe 45 were directly coupled on the shortest possible line from its admission point 46 to the swivel fitting it would be flexed first in one direction and then the other and ultimately would crack. By means of the helix shown in Fig. 4 I distribute the stresses imposed on this pipe, there being no sharp bend at any point and no concentration of stress at any point. Thus the pipe will have a long life notwithstanding the unusual conditions to which it is submitted.

The spacers 47 on bolts 8 hold the removable housing section 7 flush with the adjacent margins of the peripheral band 34, thus providing clearance within which the supply pipe 45 is coiled.

Figure 1:
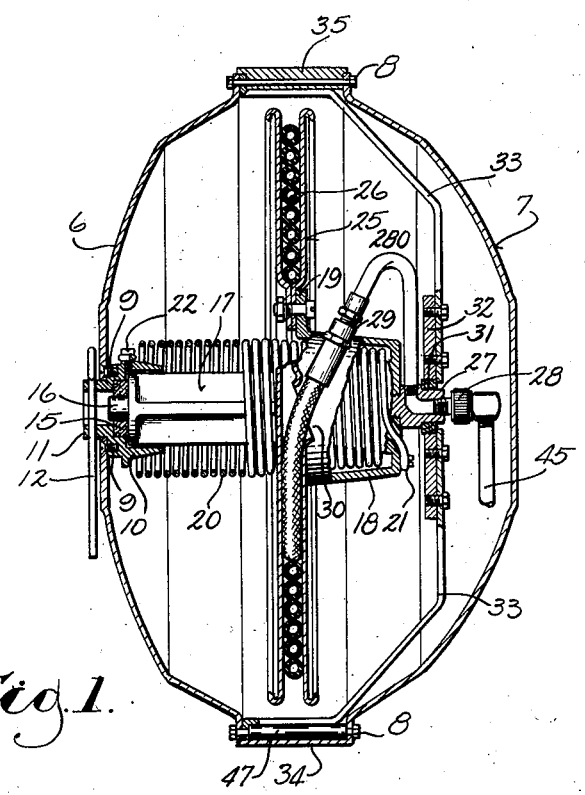
Fig. 1 is a view of my improved reel in transverse cross section.

As previously indicated, one of the important features of the invention has to do with an arrangement which makes the coiling and uncoiling of the hose with respect to the reel entirely dependent on the will of the operator. The hose is so counterbalanced as to remain in any position to which it may be adjusted. At first glance it might seem possible to make this device much more compact through the use of a torsion spring of the flat band or clock spring type. It has been found, however, that such a spring will not function successfully in this device to achieve the aforesaid objectives for the reason, as I have found, that there is a high and extremely variable degree of friction between the successive coils of the spiral spring. This difficulty I overcome by using a helical spring, rather than a spiral spring, of such length and diameter as to provide the requisite tension in a construction in which the successive coils of the helical spring are, under all conditions, preferably completely out of contact with each other as shown in Fig. 1. Since the coils do not contact, no friction can be set up between them and the operation of the spring will be smooth and uniform throughout its range.

By the particular design shown in which space is provided for a spring of adequate length, I am further able to move the reel throughout the several turns required for a complete rewinding of the hose without using more than a small proportion of the total available torsion of the spring. Because only a small portion of the total spring range is employed in the device there will be a comparatively slight variation in torsion as the spring moves between the position in which the hose is fully unwound and the position in which the hose is fully wound. Thus, regardless of whether the hose is wound fully or unwound fully, the aforesaid rigidity of the hose under pressure is sufficient to compensate fully for any variation in spring torsion and the properly adjusted spring will serve to maintain the reel stationary in any position to which the hose is adjusted. Consequently, whether the operator desires to draw out more hose or whether he desires to feed the hose to the reel, it is necessary in either case for the operator to take affirmative action in manipulating the hose either by way of pulling it from the reel or pushing it toward the reel. In view of the foregoing considerations the movement of the device is smooth and uniform under all conditions.

I claim:

1. In a high pressure greasing system, the combination of a hose reel having substantially parallel sides spaced in conformity to the diameter of the hose to be wound thereon in a single spiral coil, said reel being mounted upon a rotary support provided with grease supplying connections, a grease conveying hose normally wound upon the reel, and a spirally wound spring having one end operatively connected to the reel to impart winding torque thereto, said spring having a tension substantially equal to that required to counterbalance the weight of a grease laden hose when fully extended and being of a length substantially equal to that required to maintain such counterbalancing tension during completion of a winding operation.

2. In a high pressure greasing system, the combination of a suitable housing provided with a hose windying reel having a rotary support provided with a tubular trunnion having a swivelled head through which grease may be fed to a hose wound upon the reel, a grease delivering hose normally wound upon the reel, a looped metal pipe connection leading from the tubular trunnion to the hose and a supply pipe having a spirally coiled end portion connected with said swivelled head and supported within the housing in a manner to allow vibration without breakage due to crystallization.

3. Hose winding apparatus, comprising the combination with a fixed support, of an annular reel having side walls spaced in conformity to the diameter of the hose to be wound thereon and adapted to hold the hose to a single spiral coil, a rotary support extending through the reel annulus with its ends journaled to the fixed support, a cup-shaped sleeve member secured to one end portion of the rotary support, said sleeve member having an inner marginal flange connected with the inner margin of the annular reel, and a helical spring coiled upon the rotary support with one end extending into and secured to said cup-shaped sleeve member near one side of the fixed support, the other end of the spring being secured to the other side of the fixed support, the winding torque of said spring being substantially proportioned to the resistance of an unwound hose and also to the length of hose to be taken up in a single turn of the reel at all stages of a winding operation, whereby the hose, when at rest, will tend to remain at rest, and when in motion for a winding operation, will tend to continue in motion at a substantially uniform speed of reel rotation.

4. The hose winding apparatus set forth in claim 3, in which the fixed support includes a housing having the form of an oblate spheroid, peripherally provided with a tangentially extending swivelled head through which the hose may be guided in its movement to and from the reel without striking the housing.

5. Hose winding apparatus, comprising the combination with a fixed support, of a rotary core having its ends journaled to the fixed support, a spring helically coiled about said core with one end secured to the fixed support, an annular reel encircling said core and secured thereto, said reel having its side walls spaced in conformity to the diameter of the hose to be wound thereon and adapted to hold the hose to a single spiral coil, a hose normally wound upon said reel and having one end connected with a source of supply, said fixed support having a swivelled head through which the other end of the hose extends, and said spring having a normal tension substantially equal to the weight of the end portion of the hose projecting through said swivelled head, said spring being so proportioned in length to the length of hose wound upon the reel as to maintain such substantial counterbalance in all stages of hose withdrawal from the reel.

ARNO A. EWALD.